No. 688,085. Patented Dec. 3, 1901.
A. G. GOLDSOBEL, W. MUTTERMILCH & C. JABLCZYNSKI.
APPARATUS FOR THE RECOVERY OF PRECIOUS METALS FROM PHOTOGRAPHIC RESIDUUM.
(Application filed Feb. 6, 1900. Renewed June 10, 1901.)
(No Model.)
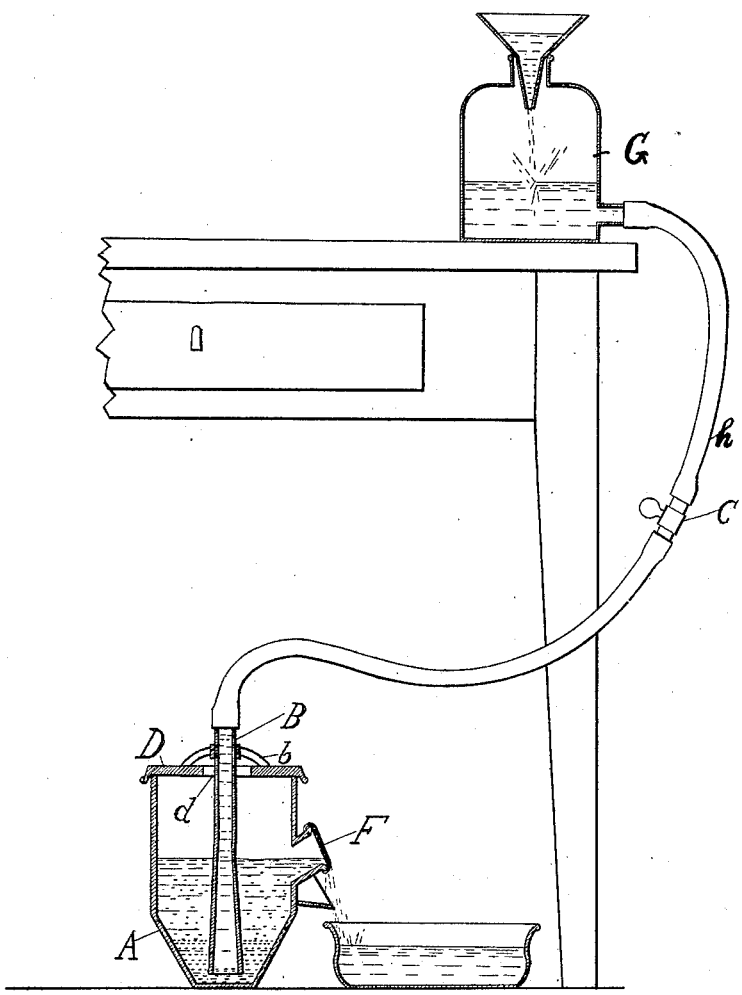

UNITED STATES PATENT OFFICE.

ANDREAS GEORGE GOLDSOBEL, WACLAW MUTTERMILCH, AND CASIMIR JABLCZYNSKI, OF WARSAW, RUSSIA.

APPARATUS FOR THE RECOVERY OF PRECIOUS METALS FROM PHOTOGRAPHIC RESIDUUM.

SPECIFICATION forming part of Letters Patent No. 688,085, dated December 3, 1901.

Application filed February 6, 1900. Renewed June 10, 1901. Serial No. 64,021. (No model.)

*To all whom it may concern:*

Be it known that we, ANDREAS GEORGE GOLDSOBEL, WACLAW MUTTERMILCH, and CASIMIR JABLCZYNSKI, subjects of the Emperor of Russia, and residents of the city of Warsaw, in the Province of Poland, Russian Empire, have invented certain new and useful Improvements in Apparatus for the Automatic Recovery of Precious Metals out of Photographic Residuum; and we hereby declare that the following is a full, clear, and exact description of our invention.

The growing use of gold, silver, and platinum salts in photography renders it necessary to devise some means for recovering these metals from the photographic residuum. The efforts which have been made with this object in view have not hitherto given anything like satisfactory results, and as a consequence the metals are still allowed to go to waste.

Our object is to provide an apparatus which will recover the precious metals from photographic residuum, and do it, moreover, automatically—that is to say, without either the time or the attention of the user of the apparatus being called upon.

The accompanying drawing illustrates our invention.

A is a reducing vessel of cylindrical form above and tapering conically underneath. This vessel is provided with a lid D, which has a hole in its center through which passes the top end of a tube B, having a funnel-shaped bottom reaching nearly to the bottom of the vessel A. This tube is held by a ring *b* on the vessel-lid. The reducing vessel A is further provided with an outlet-spout F, to which can be attached a filtering means, such as cloth. Attached to that end of the tube F which reaches out of the vessel A is an india-rubber tube *h*, whose other end is attached to a vessel G, into which the photographic residuum is emptied, so that liquid can flow from one vessel to the other.

The india-rubber tube *h*, connecting the vessels A and G, is provided with a cock C, whereby the flow of liquid can be regulated as desired.

The vessel A is filled up to a certain point with the means, such as zinc-dust, for recovering the precious metals, and by the extending of the tube B nearly to the bottom of the vessel A the residuum from vessel G has to force itself upward and is thus thoroughly mixed. The tube B is arranged funnel-shaped underneath in order that it may not get stopped up and is arranged loose above in order that it can be moved about, so as to stir up the contents of the vessel before the tap C is opened. Once the tap is opened all the operator has to do is to empty the residuum into the vessel G, and the filtered liquid flows out of spout F. From time to time the contents of the vessel A can be emptied and the desired metals recovered.

A float could be connected with the cock C, so that if the filter got stopped up the rising liquid in the vessel A would close the cock C.

Having now described our invention, what we claim, and desire to secure by Letters Patent, is—

The combination with a vessel having a loose lid, a spout or outlet for the outflow of liquid and a conical bottom and with a precipitating material contained in said vessel, of a tube having a funnel-shaped end reaching within said vessel and of a second tube provided with a cock connecting the aforesaid precipitating vessel and funnel-shaped tube with a second vessel or receiver substantially as and for the purpose described and illustrated.

In witness whereof we have hereunto set our hands in presence of two witnesses.

ANDREAS GEORGE GOLDSOBEL. [L. S.]
WACLAW MUTTERMILCH. [L. S.]
CASIMIR JABLCZYNSKI. [L. S.]

Witnesses:
BOLERDAW HORADYWITZ,
ADAM MICKICWICZ.